United States Patent [19]

Murayama et al.

[11] 3,904,581
[45] Sept. 9, 1975

[54] STABILIZATION OF SYNTHETIC POLYMERS

[75] Inventors: Keisuke Murayama; Syoji Morimura; Katsuaki Matsui; Tomoyuki Kurumada; Noriyuki Ohta; Ichiro Watanabe, all of Tokyo, Japan

[73] Assignee: Sankyo Company Limited, Tokyo, Japan

[22] Filed: Sept. 21, 1973

[21] Appl. No.: 399,611

[52] U.S. Cl............................................. 260/45.8 N
[51] Int. Cl.².......................................... C08K 5/34
[58] Field of Search............................... 260/45.8 N

[56] References Cited
UNITED STATES PATENTS

| | | | |
|---|---|---|---|
| 3,480,635 | 11/1969 | Altwicker | 260/45.8 N |
| 3,684,765 | 8/1972 | Matsui et al. | 260/45.8 N |
| 3,705,166 | 12/1972 | Murayama et al. | 260/45.8 N |

Primary Examiner—Melvyn I. Marquis
Attorney, Agent, or Firm—Toren, McGeady and Stanger

[57] ABSTRACT

A synthetic polymer composition stabilized against photo- and thermal deterioration thereof wherein there is incorporated, in a sufficient amount to prevent such deterioration, a 4-aminopiperidine derivative.

12 Claims, No Drawings

STABILIZATION OF SYNTHETIC POLYMERS

DETAILED DESCRIPTION OF THE INVENTION

This invention relates to a synthetic polymer composition which comprises a 4-aminopiperidine derivative having the following formula

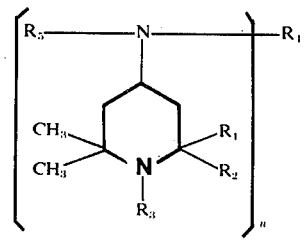

(1)

wherein $R_1$ and $R_2$ represent a lower alkyl group or $R_1$ and $R_2$, together with the carbon atom to which they are attached, represents a group

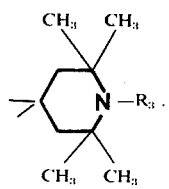

$R_3$ represent an alkyl group, a substituted alkyl group, an alkenyl group, an alkynyl group or an unsubstituted or substituted aralkyl group. $n$ is an integer of 1, 2 or 3. When $n$ is 1, $R_4$ represents a hydrogen atom, an alkyl group, a substituted alkyl group, an alkenyl group, an alkynyl group, a substituted or unsubstituted aralkyl group, a cycloalkyl group, a substituted or unsubstituted aryl group, a monoacyl group, an alkoxycarbonyl group which may be substituted with hydroxyl, an aralkoxycarbonyl gruop, an N-substituted or unsubstituted carbamoyl group, an N-substituted or unsubstituted thiocarbamoyl group or a monovalent group from an oxoacid, or $R_4$ and $R_5$, together with the nitrogen atom to which they are attached, represent a phthalimido group.

When $n$ is 2, $R_4$ is an alkylene group, an alkenylene group, an aralkylene group, an arylene group, a diacyl group, a carbonyl group, an N-substituted dicarbamoyl group, an N-substituted bisthiocarbamoyl group or a divalent group from an oxoacid, or $R_4$ and $R_5$, together with the nitrogen atom to which they are attached, represent a pyromellitodiimido group.

When n is 3, $R_4$ represents an alkanetriyl group, an aralkanetriyl group, a triacyl group, a trivalent group from an oxoacid, or a group

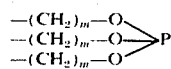

or a group

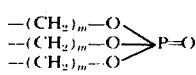

($m$ is an integer of 1–4).

$R_5$ represents a hydrogen atom, an alkyl group, a substituted alkyl group, an alkenyl group, an alkynyl group, a substituted or unsubstituted aralkyl group, a cycloalkyl group, a substituted or unsubstituted aryl group, an alkoxycarbonylalkenyl group, a 5- or 6-membered heterocyclic group containing as hetero atom nitrogen, oxygen and/or sulfur or a group

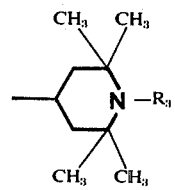

($R_3$ is as defined above) or, when $R_4$ is an alkylene group, an alkenylene group, aralkylene group, an arylene group, an alkanetriyl group, or an aralkanetriyl group, $R_5$ may be a monoacyl group, an alkoxycarbonyl group, an aralkoxycarbonyl group, a N-substituted or unsubstituted carbamoyl group, a N-substitued thiocarbamoyl group or a monovalent group from an oxoacid.

German "Offenlegungsschrift (application laid open to public insepction)" No. 2,040,975 discloses compounds having the following formula as light stabilizers for synthetic polymers

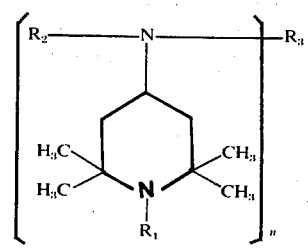

wherein $R_1$ represents a hydrogen atom or an acyl group; $R_2$ represents a hydrogen atom, an unsubstituted or substituted alkyl group, a cycloalkyl group, an unsubstituted or substituted aryl group, an unsubstituted or substituted aralkyl group or the group of the formula

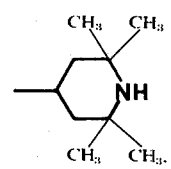

$n$ is an integer of 1 to 3 inclusive; and, when $n$ is 1, $R_3$ represents a hydrogen atom, an acyl group, an alkoxycarbonyl group, a carbamoyl group, a thiocarbamoyl group, an N-substituted carbamoyl group, an N-substituted thiocarbamoyl group or a monovalent group derived by removing one hydroxyl group from an oxoacid or $R_3$ may form, together with $R_2$ the group of the formula

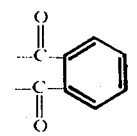

when $n$ is 2, $R_3$ represents a diacyl group, an N-substituted dicarbamoyl group, an N-substituted bisthiocarbamoyl group, a carbonyl group or a divalent group derived, by removing two hydroxyl groups, from an oxoacid, and, when $n$ is 3, $R_3$ represents a triacyl group, an N-substituted tricarbamoyl group, an N-substituted tristhiocarbamoyl group or a trivalent group derived, by removing three hydroxyl groups, from an oxoacid or a salt thereof.

Moreover, German "Offenlegungsschrift" No. 2,040,983 discloses compounds having the following as light stabilizers for synthetic polymers

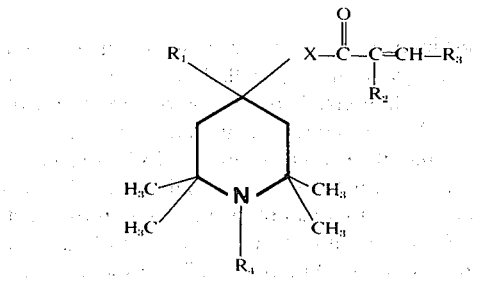

wherein $R_1$ a hydrogen atom or a cyano group; $R_2$ and $R_3$ may be the same or different from each other and each is a hydrogen atom or a methyl group; X is an imino group or an oxygen atom; and $R_4$ is a hydrogen atom or the group:

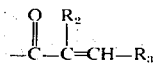

It has now been found that the 4-aminopiperidine derivatives of formula I wherein an alkyl group, a substituted alkyl group, an alkenyl group, an alkynyl group or a substituted or unsubstituted aralkyl group is introduced at a nitrogen atom of the piperidine ring have improved stabilizing effects on synthetic polymers; more particularly they effectively prevent photodeterioration, and they do not cause discoloration of the substrates even when blended with sterically-hindered phenol type derivatives commonly utilized as antioxidants, especially BHT (2,6-di-tert. butylhydroxytoluene.

Accordingly, this invention provides 4-aminopiperidine derivatives having the above-mentioned formula (I) as stabilizers for synthetic polymers as well as synthetic polymer compositions stabilized against heat and light by having incorporated therein at least one of the 4-aminopiperidine derivatives having the above-mentioned formula (I) in a sufficient amount to prevent such deterioration.

The term "synthetic polymer" as used herein is intended to embrace:
polyolefins including
homopolymers of olefins such as low-density and highdensity polyethylene, polypropylene, polystyrene, polybutadiene, polyisoprene and the like, and copolymers of olefins with other ethylenically unsaturated monomers such as ethylene-propylene copolymers, ethylenebutene copolymers, ethylenevinyl acetate copolymers, styrene-butadiene copolymers, acrylonitrile-styrenebutadiene copolymers and the like;
polyvinyl chlorides and polyvinylidene chlorides,
including homopolymers of each of vinyl chloride and vinylidene chloride, vinyl chloride-vinylidene chloride copolymer and copolymers of each of vinyl chloride and vinylidene chloride with vinyl acetate or other ethylenically unsaturated monomers;
polyacetals such as polyoxymethylene and polyoxyethylene; polyesters such as polyethylene terephthalate; polyamides such as 6-nylon, 6,6-nylon and 6,10-nylon; and polyurethanes.

Synthetic polymers have been widely utilized in various forms such as fibers, films, sheets, other shaped articles, latex and foams because of their excellent properties.

The lower alkyl groups $R_1$ and $R_2$ in the above-mentioned formula (I) have 1 to 4 carbon atoms and may be, for example, methyl, ethyl or propyl. Preferably $R_1$ and $R_2$ are each methyl. Alkyl groups represented by $R_3$ have 1 to 8 carbon atoms and are, for example, methyl, ethyl, propyl, butyl or octyl; substituted alkyl groups $R_3$ have 1 to 3 carbon atoms in the alkyl moiety and are for example, hydroxyalkyl, e.g., 2-hydroxyethyl; alkoxyalkyl having 1 or 2 carbon atoms in the alkoxy moiety, e.g., 2-ethoxyethyl or ethoxymethyl, aryloxyalkyl in which the aryl is phenyl, e.g., 2-phenoxyethyl, aliphatic acyloxyalkyl having 2 to 18 carbon atoms in the acyl moiety and aromatic acyloxyalkyl having 7 to 11 carbon atoms in the acyl moiety, e.g., 2-acetoxy ethyl, 2-stearoyloxyethyl, 2-benzoyloxyethyl or 2-acryloyloxyethyl; halogenoalkyl, e.g., 2-chloroethyl; cyanoalkyl, e.g., 2-cyanoethyl or cyanomethyl; epoxyalkyl, e.g., 2,3-epoxypropyl; aminoalkyl substituted on the nitrogen atom by alkyl groups having 1 to 4 carbon atoms, e.g., diethylamine methyl; alkoxycarbonylalkyl in which the alkoxy moiety has 1 to 4 carbon atoms, e.g., ethoxycarbonylmethyl, butoxycarbonylmethyl, 2-ethoxycarbonylpropyl or 2-methoxycarbonylethyl, or aryloxycarbonylalkyl in which the aryl is phenyl, e.g., phenoxycarbonylmethyl; alkenyl groups represented by $R_3$ have 3 to 4 carbon atoms and are, for example, allyl; alkynyl groups $R_3$ have 3 or 4 carbon atoms and are, for example 2-propynyl; substituted or unsubstituted aralkyl groups $R_3$ are benzyl which may be substituted by alkyl groups having 1 to 4 carbon atoms or by chlorine atoms on the phenyl part and are, for example, benzyl, p-methylbenzyl or p-chlorobenzyl. According to a preferred embodiment, $R_3$ represents an alkyl group having 1 to 4 carbon atoms, an allyl group, an alkoxycarbonylmethyl group in which the alkoxy has 1 to 4 carbon atoms a 2,3-epoxypropyl group, an aliphatic 2 acyloxyethyl group in which the acyl has moiety has 2 to 4 carbon atoms or a benzyl group; most preferably $R_3$ represents the methyl group.

When $n$ is 1, alkyl groups represented by $R_1$ 1 to 18 carbon atoms and are, for example, methyl, ethyl, propyl, isopropyl, n-butyl, hexyl, heptyl, octyl, dodecyl or stearyl; substituted alkyl groups; alkenyl, the alkynyl and substituted or unsubstituted groups represented by $R_1$ are the same as exemplified with regard to the $R_3$, or 3,5-di-t-butyl-4-hydroxybenzyl; cycloalkyl groups $R_4$ have 5 or 6 carbon atoms and are, for example, cyclohexyl; substituted or unsubstituted aryl groups $R_4$ have 6 to 10 carbon atoms in the aryl moiety and may be substituted on said aryl by alkyl or alkoxy groups having 1 to 4 carbon atoms and are, for example, phenyl, o-, m- or p-tolyl, o-, m- or p-methoxyphenyl or α- or β-naphthyl; monoacyl groups represented by $R_4$ are, for example, aliphatic monoacyl groups having 2 to 18 carbon atoms e.g., acetyl, propionyl, butyryl, octanoyl, lauroyl, stearoyl, acetoacetyl, 3-octylthiopropionyl, acryloyl, methacryloyl, crotonyl, sorboyl, cinnamoyl, phenylacetyl or 3-(3,5-di-tert-butyl-4-hydroxyphenyl)-propionyl, cycloaliphatic monoacyl groups having 6 to 7 carbon atoms, e.g., cyclohexanecarbonyl; aromatic monoacyl groups which have 6 to 10 carbon atoms in the aryl moiety and which may be substituted on said aryl by alkyl groups having 1 to 4 carbon atoms, by chlorine, hydroxy or methoxy groups, e.g., benzoyl, o-, m- or p-toluoyl, o-, m- or p-chlorobenzoyl, salicyloyl, o-, m- or p-anisoyl, p-tert.-butylbenzoyl or α- or β-naphthoyl, or heterocyclic monoacyl groups comprising oxygen atom or nitrogen atoms as hetero atoms, e.g., 2-furoyl, morpholinecarbonyl, isonicotinoyl or nicotinoyl; alkoxycarbonyl groups represented by $R_4$ may be substituted with hydroxyl groups and have 1 to 8 carbon atoms in the alkoxy moiety, for example, ethoxycarbonyl, octoxycarbonyl or 2-hydroxyethoxycarbonyl; aralkoxycarbonyl groups $R_4$ have benzyl as the aralkyl and are, for example, benzyloxycarbonyl; the substituents of N-substituted carbamoyl and N-substituted thiocarbamoyl groups $R_4$ are, for example, alkyl groups having 1 to 4 carbon atoms, such as methyl or ethyl, cyclohexyl, phenyl, chlorophenyl, α- or β-naphthyl or benzyl groups. If $R_4$ is a monovalent group derived from an oxoacid, a group is meant which is derived, by removing one hydroxyl group, from a substituted or unsubstituted sulfenic, sulfinic, sulfonic, phosphorous or phosphoric acid. As examples of such oxoacids there may be mentioned methanesulfenic acid, benzenesulfenic acid, benzenesulfinic acid, methanesulfonic acid, benzenesulfonic acid, p-toluenesulfonic acid or diphenyl phosphorous acid.

When $n$ is 2, alkylene groups represented by $R_4$ have 2 to 6 carbon atoms and are, for example, ethylene, propylene, tetramethylene or hexamethylene; alkenylene groups $R_4$ have 4 to 6 carbon atoms and are, for example, 2-butenylene; aralkylene groups $R_4$ have 8 to 10 carbon atoms and are, for example, p-xylylene; arylene groups have 6 to 8 carbon atoms and are, for example, p-phenylene or 2,4-tolyene. Diacyl groups represented by $R_4$ may be aliphatic diacyl groups having 2 to 18 carbon atoms, e.g., oxalyl, malonyl, succinyl, adipoyl, suberoyl, sebacoyl or fumaryl, aromatic diacryl groups having 8 carbon atoms, e.g., isophthaloyl or terephthaloyl, cycloaliphatic or and heterocyclic diacyl groups. The substituents of N-substituted dicarbamoyl and N-substituted bisthiocarbamoyl group $R_4$ are, for example, alkylene groups having 2 to 6 carbon atoms, e.g., butylene or hexamethylene, arylene groups having 6 to 8 carbon atoms., e.g., pphenylene or 2,4-tolylene and p,p'-methanediphenylene. By By divalent groups $R_4$ derived from an oxoacid groups are meant which are derived, by removing two hydroxyl groups, from a sulfurous, sulfuric, substituted or unsubstituted sulfinic, sulfonic, phosphorous or phosphoric acid. Examples of such oxoacid are, sulfurous sulfuric, benzene-1,3-disulfonic, phenylsulfurous or phenylphosphoric acid.

When $n$ is 3, alkanetriyl groups represented by $R_4$ have 5 or 6 carbon atoms and are, for example,

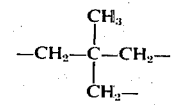

or

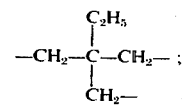

aralkanetriyl groups $R_4$ have 9 carbon atoms of 9 and are, for example

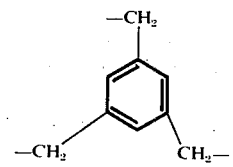

or

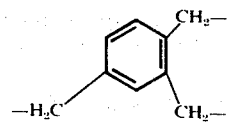

Triacyl groups represented by $R_4$ aliphatic triacyl groups having 6 carbon atoms, e.g., the propane-1,2,3-tricarbonyl group, aromatic triacyl groups having 9 carbon atoms, e.g., the benzene-1,2,4-tricarbonyl or benzene-1,3,5-tricarbonyl group; by trivalent groups $R_4$ derived from an oxoacid groups are meant which are derived by removing three hydroxyl group, from an oxoacid such as phosphoric, phosphorous or boric acid, for example,

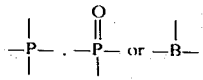

and

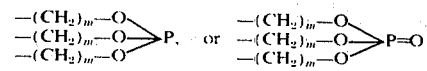

for example, the corresponding groups wherein $m$ is 2. $R_4$ preferably represents an alkyl group having 1 to 18 carbon atoms, an allyl gruop, a benzyl group, a 2,3-epoxypropyl group, an aliphatic monoacyl group having 2 to 18 carbon atoms, benzoyl group, a 2-hydroxyethoxycarbonyl group, an alkylene group having 2 to 6 carbon atoms or an aliphatic diacyl group having 2 to 18 carbon atoms.

Alkyl, substituted alkyl, alkenyl, alkynyl, substituted or unsubstituted aralkyl, cycloalkyl, substituted or unsubstituted aryl, monoacyl, alkoxycarbonyl, aralkoxycarbonyl, N-substituted or unsubstituted carbamoyl, N-substituted or unsubstituted thiocarbamoyl groups and monovalent groups derived from an oxoacid represented by $R_5$ are the same as exemplified above with regard to $R_3$ or $R_4$; alkoxy carbonylalkenyl groups $R_5$ which have 1 to 4 carbon atoms in the alkoxy moiety and 2 or 3 carbon atoms in the alkenyl moiety, for example, 2-ethoxycarbonylvinyl or 1-methyl-2-methoxycarbonylvinyl; 5 or 6-membered heterocyclic groups $R_5$ containing as hetero atom nitrogen, oxygen and/or sulfur are, for example, 2-thiazolyl, 2-pyridyl or 2-pyrimidyl. Most preferably $R_5$ represents a hydrogen atom, an alkyl group having 1 to 8 carbon atoms, a hydroxyethyl phenyl cyclohexyl or benzyl group, and still more preferably $R_5$ is a hydrogen atom.

n is preferred to be an integer of 1 or 2.

Representative 4-amino piperidine derivatives (I) of this invention are illustrated below, but the compounds illustrated hereunder are not intended to limit this invention.

1. 4-Amino-1,2,2,6,6-pentamethylpiperidine
2. 4-Acetamido-2,2,6,6,-tetramethyl-1-octylpiperidine
3. 4-Acetamido-1-ethoxymethyl-2,2,6,6,-tetramethylpiperdine
4. 4-Caprylamido-1,2,2,6,6-pentamethylpiperidine
5. 4-Lauramido-1,2,2,6,6-pentamethylpiperidine
6. 1,2,2,6,6-Pentamethyl-4-stearamidopiperidine
7. 4-(β-Butylthiopropionamido)-1,2,2,6,6-pentamethylpiperidine
8. 4-Acrylamido-1,2,2,6,6-pentamethylpiperidine
9. 4-Acrylamido-1-allyl-2,2,6,6-tetramethylpiperidine
10. 4-Acrylamido-1-cyanomethyl-2,2,6,6-tetramethylpiperidine
11. 4-Methacrylamido-1,2,2,6,6-pentamethylpiperidine
12. 4-Crotonamido-1,2,2,6,6-pentamethylpiperidine
13. 1,2,2,6,6-Pentamethyl-4-phenylacetamidopiperidine
14. β-Hydroxyethyl-1,2,2,6,6-pentamethyl-4-piperidylcarbamate
15 4-Cyclohexanecarbonamido-1,2,2,6,6-pentamethylpiperidine
16. 4-Benzamido-1,2,2,6,6-pentamethylpiperidine
17. 4-(p-Chlorobenzamido)-1(β-hydroxyethyl)-2,2,6,6-tetramethylpiperidine
18. 1-(β-Acetoxyethyl)-4-(p-chlorobenzamido)-2,2,6,6-tetramethylpiperidine
19. 2,2,6,6-Tetramethyl-4-(o-toluamido)-1-(2-propynyl)-piperidine
20. 1-(2,3-Epoxypropyl)-2,2,6,6-tetramethyl-4-(o-toluamido)piperidine
21. 1,2,2,6,6-Pentamethyl-4-(β-naphthoamido)piperidine
22. 4-(p-t-Butylbenzamido)-1,2,2,6,6-pentamethylpiperidine
23. 1,2,2,6,6-Pentamethyl-4-nicotinamidopiperidine
24. 4-(2-Furamido)-1,2,2,6,6-pentamethylpiperidine
25. 1-Benzyl-4-butylamino-2,2,6,6-tetramethylpiperidine
26. 4-(β-Hydroxyethylamino)-1,2,2,6,6-pentamethylpiperidine
1-Benzyl-4-(β-ethoxycarbonyl-β-ethoxycarbonyl-β-methylethylamino)-2,2,6,6-tetramethylpiperidine
28. 4-Benzylamino-1,2,2,6,6-pentamethylpiperidine
29. 4-Cyclohexylmethacryloylamino-1,2,6,6-pentamethylpiperdine
30. 4-(p-Methoxyanilino)-1,2,2,6,6-pentamethylpiperidine
31. 4-(3,5-Di-t-butyl-4-hydroxybenzylamino)-1,2,2,6,6-pentamethylpiperidine
32. 4-Methanesulfenamido-1,2,2,6,6-pentamethylpiperidine
33. 4-Benzenesulfenamido-1,2,2,6,6-pentamethylpiperidine
34. 4-Benzenesulfinamido-1,2,2,6,6-pentamethylpiperidine
35. 4-Methanesulfonamido-1,2,2,6,6-pentamethylpiperidine
36. 1,2,2,6,6-Pentamethyl-4-(p-toluenesulfonamido)-piperidine
37. 1-Ethoxycarbonylmethyl-2,2,6,6-tetramethyl-4-(p-toluenesulfonamido)piperidine
38. 1,2,2,6,6-Pentamethyl-4-piperidylurea
39. 1-Ethyl-3-(2,2,6,6-tetramethyl-1-octyl-4-piperidyl)-urea
40. 1-Benzyl-3-(1,2,2,6,6-pentamethyl-4-piperidyl)urea
41. 1-Cyclohexyl-3-(1,2,2,6,6-pentamethyl-4-piperidyl)-urea
42. 1-Phenyl-3-[2,2,6,6-tetramethyl-1-(2,3-epoxypropyl)-4-piperidyl]urea
43. 1-(p-Chlorophenyl)-3-(1,2,2,6,6-pentamethyl-4-piperidyl)urea
44. 1-(α-Naphthyl)-3-(1,2,2,6,6-pentamethyl-4-piperidyl)-urea
45. 1,2,2,6,6-Pentamethyl-4-piperidylthiourea
46. 1-Ethyl-3-(1,2,2,6,6-pentamethyl-4-piperidyl)thiourea
47 1-Phenyl-3-(1,2,2,6,6-pentamethyl-4-piperidyl)thiourea
48. 1,1-Dimethyl-3-(1,2,2,6,6-pentamethyl-4-piperidyl)-urea
49. 1,2,2,6,6-Pentamethyl-4-(1-morpholinecarbonamido)piperidine
50. 4-(N-Acetylallylamino)-1,2,2,6,6-pentamethylpiperidine
51. 4-(N-Acetyl-2-propynylamino)-1,2,2,6,6-pentamethylpiperidine
52. 4-(N-Acetyldiethylamino-methylamino)-1,2,2,6,6-pentamethylpiperidine
53. 1,2,2,6,6-Pentamethyl-4-(N-stearoyl-β-stearoyloxyethylamino)piperidine
54. 1-Benzyl-4-(N-acryloylbutylamino)-2,2,6,6-tetramethylpiperidine
55. 4-(N-Acryloylisopropylamino)-1,2,2,6,6-pentamethylpiperidine
56. 4-(N-Acryloyl-p-methoxyanilino)-1,2,2,6,6-pentamethylpiperidine
57. 4-(N-Methacryloyl-2-methoxycarbonylpropylamino)-1,2,2,6,6-pentamethylpiperidine
58. 1,2,2,6,6-Pentamethyl-4-(N-stearoyl-β-ethoxycarbonylvinylamino)piperidine
59. 4-(N-Methacryloyl-α-methyl-β-methoxycarbonylvinylamino)-1,2,2,6,6-pentamethylpiperidine
60. 1,2,2,6,6-Pentamethyl-4-(N-tosyl-β-cyanoethylamino)piperidine
61. 4-(N-Benzoylbenzylamino)-1,2,2,6,6-pentamethylpiperidine 62. 4-(N-Benzoylanilino)-1,2,2,6,6-pentamethylpiperidine
63. 1,2,2,6,6-Pentamethyl-4-(N-tosyl-β-hydroxyethylamino)piperidine
64. N,N-Bis(1,2,2,6,6-pentamethyl-4-piperidyl)acetylamine
65. 4-Dibutylamino-1,2,2,6,6-pentamethylpiperidine
66. 4-(N-Methylisopropylamino)-1,2,2,6,6-pentamethylpiperidine
67. 1,9-Diaza-1,2,2,8,8,9,10,10-octamethyl-4-(N-methylisopropylamino)-spiro[5,5]undecane
68. 4-(N-Cyclohexyloctylamino)-2,2,6,6-tetramethyl-1-octylpiperidine
69. 1,2,2,6,6-Pentamethyl-4-(N-methylbenzylamino)piperidine
70. 1,2,2,6,6-Pentamethyl-4-(N-methylanilino)piperidine
71. 1,2,2,6,6-Pentamethyl-4-(N-methyl-α-naphthylamino)piperidine
72. 1,2,2,6,6-Pentamethyl-4-(N-methyl-2-thiazolylamino)piperidine
73. Methyl α-methyl-β-methylamino-N-(1,2,2,6,6-pentamethyl-4-piperidyl)propionate
74. 4-(N-Methyl-β-cyanoethylamino)-1,2,2,6,6-pentamethylpiperidine
75. Ethyl β-methylamino-N-(1,2,2,6,6-pentamethyl-4-piperidyl)acrylate
76. Methyl β-methylamino-N-(1,2,2,6,6-pentamethyl-4-piperidyl)crotonate
77. 1-(β-Cyanoethyl)-4-bis(β-cyanoethyl)amino-2,2,6,6-tetramethylpiperidine
78. N-Methyl-bis(1,2,2,6,6-pentamethyl-4-piperidyl)amine
79. 1-Benzyl-4-(N-2-hydroxyethyl-2-benzoyloxyethylamino)2,2,6,6-tetramethylpiperidine
80. 1-Allyl-4-(N-allylbenzylamino)-2,2,6,6-tetramethylpiperidine
81. 2,2,6,6-Tetramethyl-1-(2-propynyl)-4-(N-2-propynylbenzylamino)piperidine
82. 1-Cyanomethyl-4-(N-cyanomethylbenzylamino)-2,2,6,6-tetramethylpiperidine
83. 1-(2,3-Epoxypropyl)-4-[N-(2,3-epoxypropyl)benzylamino]-2,2,6,6-tetramethylpiperidine
84. 1-(2-Ethoxyethyl)-4-[N-(2-ethoxyethyl)benzylamino]-2,2,6,6-tetramethylpiperidine
85. 1-(2-Acetoxyethyl)-4-[N-(2-acetoxyethyl)benzylamino]-2,2,6,6-tetramethylpiperidine
86. 1-(2-Acryloyloxyethyl)-4-[N-(2-acryloyloxyethyl)benzylamino]-2,2,6,6-tetramethylpiperidine
87. 1-Ethoxycarbonylmethyl-4-(N-ethoxycarbonylmethylbenzylamino)-2,2,6,6-tetramethylpiperidine
88. 1-Ethoxycarbonylmethyl-4-(N-ethoxycarbonylmethyl-p-anisidino)-2,2,6,6-tetramethylpiperidine
89. 4-(N-Benzyl-p-methylbenzylamino)-2,2,6,6-tetramethyl-1-p-methylbenzylpiperidine
90. 4-(N-Benzyl-p-chlorobenzylamino)-1-p-chlorobenzyl-2,2,6,6-tetramethylpiperidine
91. 1-Ethoxycarbonylmethyl-2,2,6,6-tetramethyl-4-phthalimidopiperidine
92. 4-(N-Acetyl-2-thiazolylamino)-1,2,2,6,6-pentamethylpiperidine
93. 1,3-Bis(1,2,2,6,6-pentamethyl-4-piperidyl)urea
94. N,N'-Bis(1,2,2,6,6-pentamethyl-4-piperidyl)oxalamide
95. N,N'-Bis(1-ethoxymethyl-2,2,6,6-tetramethyl-4-piperidyl)malonamide
96. N,N'-Bis(1,2,2,6,6-pentamethyl-4-piperidyl)adipamide
97. N,N'-Bis(1,2,2,6,6-pentamethyl-4-piperidyl)sebacamide
98. N,N'-Bis(1,2,2,6,6-pentamethyl-4-piperidyl)fumaramide
99. N,N'-Bis[2,2,6,6-tetramethyl-1-(2-propynyl)-4-piperidyl]terephthalamide
100. 1,1'-Bis(1,2,2,6,6-pentamethyl-4-piperidyl)-3,3'-hexamethylenediurea
101. p,p'-Bis[3-(1,2,2,6,6-pentamethyl-4-piperidyl)-1-ureido]diphenylmethane
102. 1,1'-Bis(1,2,2,6,6-pentamethyl-4-piperidyl)-3,3'-(2,4-tolylene)diurea
103. N,N'-Bis(1,2,2,6,6-pentamethyl-4-piperidyl)-surfurousdiamide
104. N,N'-Bis(1,2,2,6,6-pentamethyl-4-piperidyl)sulfamide
105. N,N'-Bis(1,2,2,6,6-pentamethyl-4-piperidyl)-1,3-benzenedisulfonamide
106. N,N'-Bis(1,2,2,6,6-pentamethyl-4-piperidyl)ethylenediamine
107. N,N'-Dibenzyl-N,N'-bis(1,2,2,6,6-pentamethyl-4-piperidyl)sebacamide
108. N,N'-Dimethyl-N,N'-bis(1,2,2,6,6-pentamethyl-4-piperidyl)ethylenediamine
109. N,N'-Diisobutyroyl-N,N'-bis(1,2,2,6,6-pentamethyl-4-piperidyl)-1,2-diaminopropane
110. N,N'-Distearoyl-N,N'-bis(1,2,2,6,6-pentamethyl-4-piperidyl)ethylenediamine
111. N,N'-Dimethyl-N,N'-bis(1,2,2,6,6-pentamethyl-4-piperidyl)hexamethylene-1,6-diamine
112. N,N'-Di-p-tosyl-N,N'-bis(1,2,2,6,6-pentamethyl-4-piperidyl)hexamethylene-1,6-diamine
113. N,N'-Dibenzyl-1,4-bis(1,2,2,6,6-pentamethyl-4-piperidylamino)-2-butene
114. N,N'-Dibutyl-α,α'-bis(1-benzyl-2,2,6,6-tetramethyl-4-piperidylamino)-p-xylene
115. N,N'-Bisphenylcarbamoyl-α,α'-bis(1,2,2,6,6-pentamethyl-4-piperidylamino)-p-xylene
116. N,N'-Dimethyl-p,p'-bis(1,2,2,6,6-pentamethyl-4-piperidylamino)diphenylmethane
117. N,N'-Bis(1,2,2,6,6-pentamethyl-4-piperidyl)pyromellitodiimide
118. Tris(1,2,2,6,6-pentamethyl-4-piperidylamino)phosphine
119. Tris(1,2,2,6,6-pentamethyl-4-piperidylamino)phosphine oxide
120. Tris(1,2,2,6,6-pentamethyl-4-piperidylamino)boron
121. N,N',N''-Tris(1,2,2,6,6-pentamethyl-4-piperidyl)-1,3,5-benzenetricarbonamide
122. N,N',N''-Tribenzyl-1,1,1-tris(1,2,2,6,6-pentamethyl-4-piperidylaminomethyl)ethane
123. N,N',N''-Trisbenzyloxycarbonyl-1,1,1-tris(1,2,2,6,6-pentamethyl-4-piperidylaminomethyl)ethane 124. N,N′,N″-Triacetyl-1,3,5-tris(1,2,2,6,6-pentamethyl-4-piperidylaminomethyl)benzene 125. N,N′,N″-Triacetyl-1,3,5-tris(1,2,2,6,6-pentamethyl-4-piperidylamino)triethylphosphite 126. 4-(2-Hydroxyethoxycarbonylamino)-1,2,2,6,6-pentamethylpiperidine Furthermore, compounds having the following general formula (Ia) are preferred among the compounds represented by the aforementioned general formula (I)

wherein $l$ represents 1 or 2, and when $l$ is 1, $R_6$ represents a saturated aliphatic monoacyl group having 8 to 18 carbon atoms, an unsaturated aliphatic monoacyl group having 3 or 4 carbon atoms, or the 2-hydroxyethoxycarbonyl group and when $l$ is 2, $R_6$ represents a saturated aliphatic diacyl group having 4 to 10 carbon atoms.

The 4-aminopiperidine derivatives (I) of this invention may be easily synthesized according to the methods shown in the Table below.

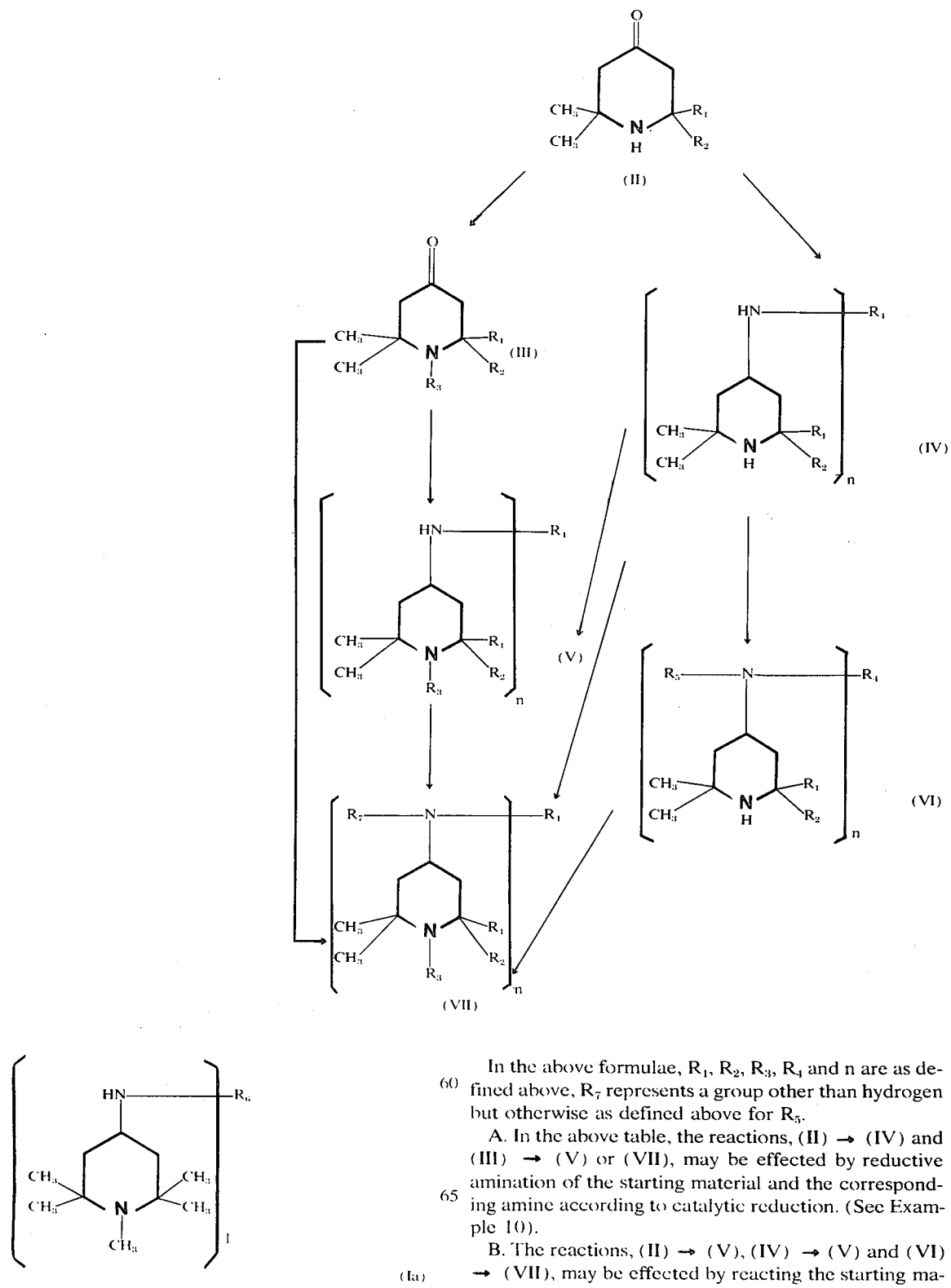

In the above formulae, $R_1$, $R_2$, $R_3$, $R_4$ and n are as defined above, $R_7$ represents a group other than hydrogen but otherwise as defined above for $R_5$.

A. In the above table, the reactions, (II) → (IV) and (III) → (V) or (VII), may be effected by reductive amination of the starting material and the corresponding amine according to catalytic reduction. (See Example 10).

B. The reactions, (II) → (V), (IV) → (V) and (VI) → (VII), may be effected by reacting the starting material with the corresponding halide in the presence of an acid binding agent. (See Example 11)

C. Alternatively, the desired product wherein $R_3$ is methyl may be prepared by reacting the starting material with formaldehyde and formic acid according to Leuckart reaction. (See Examples 12 and 13)

D. The reactions, (IV) → (VI) or (VII) and (V) → (VII), may be effected reacting the starting material with the corresponding halide in the presence of an acid binding agent (Examples 14 and 15).

The 4-aminopiperidine derivatives (I) employed as stabilizers in the present invention may be readily incorporated into the synthetic polymers by any of the various standard procedures commonly utilized in the art. The stabilizer may be incorporated into the synthetic polymer at any desired stage prior to the manufacture of shaped articles therefrom. Thus, for example, the stabilizer, in the form of a dry powder, may be admixed with the synthetic polymer, or a suspension or emulsion of the stabilizer may be admixed therewith.

The amount of the 4-aminopiperidine derivatives (I) employed in the synthetic polymer in accordance with the present invention may be varied widely, depending upon the types, properties and particular uses of the synthetic polymer to be stabilized. In general, the derivatives may be added to the synthetic polymer in an amount ranging from 0.01 to 5.0% by weight, based on the amount of the synthetic polymer, but the practical range is varied depending upon the type of the synthetic polymer, for instance, 0.01 to 2.0% by weight, preferably 0.02 to 1.0% by weight for polyolefins, 0.01 to 1.0% by weight, preferably 0.02 to 0.5% by weight for polyvinyl chloride and polyvinylidene chloride, and 0.01 to 5.0% by weight, preferably 0.02 to 2.0% by weight for polyurethanes and polyamides.

The above-mentioned stabilizer may be used in admixture with other known additives such as antioxidants, ultraviolet absorbers, fillers, pigments and the like.

Such additives are exemplified as follows.

1. Antioxidants 1.1 Simple 2,6-dialkylphenols, such as, for example, 2,-6-di-tert.-butyl-4-methylphenol, 2-tert.-butyl-4,6-dimethylphenol, 2,6-di-tert.-butyl-4-methoxymethylphenol and 2,6-dioctadecyl-4-methylphenol.

1.2. Derivatives of alkylated hydroquinones, such as, for example, 2,5-di-tert.-butyl-hydroquinone, 2,5-di-tert.-amyl-hydroquinone, 2,6-di-tert.-butylhydroquinone, 2,5-di-tert.-butyl-4-hydroxyanisole, 3,5-di-tert.-butyl-4-hydroxy-anisole and tris-(3,5-di-tert.-butyl-4-hydroxyphenyl)-phosphite, 3,5-di-tert.-butyl-4-hydroxyphenyl-stearate, di-(3,5-di-tert.-butyl-4-hydroxyphenyl)-adipate.

1.3. Hydroxylated thiodiphenyl ethers, such as, for example, 2,2'-thiobis-(6-tert.-butyl-4-methylphenol), 2,2'-thiobis-(4-octylphenol), 4,4'-thiobis-(6-tert.-butyl-3-methylphenol), 4,4'-thiobis-(3,6-di-sec.-amylphenol) and 4,4'-thiobis-(6-tert.-butyl-2-methylphenol), 4,4'-Bis(2,6-dimethyl-4-hydroxyphenyl)-disulfide.

1.4. Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di-(3-tert.-butyl-5-methyl-2-hydroxybenzyl)-4-methylphenol, 2,2'-methylene-bis-[4-methyl-6-(α-methylcyclohexyl)-phenol], 1,1-bis-(3,5-dimethyl-2-hydroxyphenyl)-butane, 1,1-bis-(5-tert.-butyl-4-hydroxy-2-methylphenyl)-butane, 2,2-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercapto-butane, 1,1,5,-5-tetra-(5-tert.-butyl-4-hydroxy-2-methylphenyl)-pentane and ethylene glycol-bis-[3,3-bis-(3'-tert.-butyl-4'-hydroxyphenyl)-butyrate].

1.5. O-, N- and S-benzyl compounds, such as, for example, 3,5,3',5'-tetra-tert.-butyl-4,4'-dihydroxydibenzylether, 4-hydroxy-3,5-dimethylbenzyl-mercaptoacetic acid octadecyl ester, tri-(3,5-di-tert.-butyl-4-hydroxybenzyl)-amine, and bis-(4-tert.-butyl-3-hydroxy-2,6-dimethylbenzyl)-dithiolterephthalate.

1.6. Hydroxybenzylated malonic esters, such as, for example, 2,2-bis-(3,5-di-tert.-butyl-2-hydroxybenzyl)-malonic acid dioctadecyl ester, 2-(3-tert.-butyl-4-hydroxy-5-methylbenzyl)-malonic acid dioctadecyl ester, 2,2-bis-(3,5-di-tert.-butyl-4-hydroxybenzyl)-malonic acid di-dodecylmercaptoethyl ester and 2,2-bis-(3,5-di-tert.-butyl-4-hydroxybenzyl)-malonic acid di-(4-tert.-octylphenyl)ester.

1.7 Hydroxybenzyl-aromatics, such as, for example, 1,-3,5-tri-(3,5-di-tert.-butyl-4-hydroxybenzyl)-2,4,6-trimethylbenzene, 1,4-di-(3,5-di-tert.-butyl-4-hydroxybenzyl)-2,3,5,6-tetramethylbenzene and 2,4,6-tri-(3,5-di-tert.-butyl-4-hydroxybenzyl)phenol.

1.8 s-Triazine compounds, such as, for example, 2,4-bis-octylmercapto-6-(3,5-di-tert.-butyl-4-hydroxyanilino)-s-triazine, 2-octylmercapto-4,6-bis-(3,5-di-tert.-butyl-4-hydroxyanilino)-2-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert.-butyl-4-hydroxyphenylethyl)-s-triazine and 1,3,5-tris-(3,5-di-tert.-butyl-4-hydroxybenzyl)-isocyanurate.

1.9 Amides of 3,5-di-tert.-butyl-4-hydroxyphenylpropionic acid, such as, for example 1,3,5-tri-(3,5-di-tert.-butyl-4-hydroxyphenyl-propionyl)-hexahydro-s-triazine and N,N'-di-(3,5-di-tert.-butyl-4-hydroxyphenylpropionyl)-hexamethylenediamine.

1.10. Esters of 3,5-di-tert.-butyl-4-hydroxyphenylpropionic acid with monohydric or polyhydric alcohols, such as, for example, methanol, ethanol, octadecanol, 1,6-hexanediol; 1,9-nonanediol, ethylene glycol, 1,2-propanediol, diethylene glycol, thiodiethylene glycol, neopentyl glycol, pentaerythritol, 3-thiaundecanol, 3-thia-pentadecanol, trimethylhexanediol, trimethylolethane, trimethylolpropane, tris-hydroxyethyl-isocyanurate and 4-hydroxymethyl-1-phospha-2,6,7-trioxa-bicyclo [2,2,2] octane.

1.11 Esters of 5-tert.-butyl-4-hydroxy-3-methylphenylpropionic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thia-undecanol, 3-thia-pentadecanol, trimethylhexanediol, trimethylolethane, trimethylolpropane, trishydroxyethyl-isocyanurate and 4-hydroxymethyl-1-phospha-2,6,7-trioxabicyclo [2,2,2] octane.

1.12. Esters of 3,5-di-tert.-butyl-4-hydroxyphenylacetic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thiaundecanol, 3-thia-pentadecanol, trimethylhexanediol, trimethylolethane, trimethylolpropane, trishydroxyethyl-isocyanurate and 4-hydroxymethyl-1-phospha-2,6,7-tri-oxabicyclo [2,2,2] octane.

1.13. Acylaminophenols, such as, for example, N-(3,5-di-tert.-butyl-4-hydroxyphenyl)-stearic acid amide and N,N'-di-(3,5-di-tert.-butyl-4-hydroxyphenyl)-thio-bis-acetamide.

1.14. Benzylphosphonates, such as, for example, 3,5-di-tert.-butyl-4-hydroxybenzyl-phosphonic acid dimethyl ester, 3,5-di-tert.-butyl-4-hydroxybenzyl-phosphonic acid diethyl ester, 3,5-di-tert.-butyl-4-hydroxybenzyl-phosphonic acid dioctadecyl ester and 5-tert.-butyl-4-hydroxy-3-methylbenzylphosphonic acid dioctadecyl ester.

1.15 Aminoaryl derivatives, such as, for example, phenyl-1-naphthylamine, phenyl-2-naphthylamine, N,N'-diphenyl-p-phenylenediamine, N,N'-di-2-naphthyl-p-phenylenediamine, N,N'-di-sec.-butyl-p-phenylenediamine, 6-ethoxy-2,2,4-trimethyl-1,2-dihydroquinoline, 6-dodecyl-2,2,4-trimethyl-1,2-dihydroquinoline, mono- and di-octyliminodibenzyl and polymerised 2,2,4-trimethyl-1,2-dihydroquinoline.

2. UV-absorbers and light protection agents 2.1. 2-(2'-Hydroxyphenyl)-benztriazoles, such as, for example, the 5'-methyl-, 3',5'-di-tert.-butyl-, 5'-tert.-butyl-, 5'-(1,1,3,3-tetramethyl-butyl)-, 5-chloro-3',5'-di-tert.-butyl-, 5-chloro-3'-tert.-butyl-5'-methyl-, 3'-sec.-butyl-5'-tert.-butyl-, 3'-[α-methyl-benzyl]-5'-methyl-, 3'-[α-methylbenzyl]-5'-methyl-5-chloro-, 4'-hydroxy-, 4'-methoxy, 4'-octoxy-, 3',5'-di-tert.-amyl-, 3'-methyl-5'-carbomethoxyethyl- or 5-chloro-3',5'-di-tert.-amyl-derivative.

2.2. 2,4-Bis-(2'-hydroxyphenyl)-6-alkyl-s-triazines, such as, for example, the 6-ethyl-, 6-undecyl- or 6-heptadecyl-derivative.

2.3 2-Hydroxy-benzophenones, such as, for example, the 4-hydroxy-, 4-methoxy-, 4-octoxy-, 4-decyloxy-, 4-dodecyloxy-, 4-benzyloxy-, 4,2',4'-trihydroxy- or 2'-hydroxy-4,4-dimethoxy-derivative.

2.4 1,3-Bis-(2'-hydroxy-benzoyl)-benzenes, such as, for example, 1,3-bis-(2'-hydroxy-4'-hexyloxybenzoyl)-benzene, 1,3-bis-(2'-hydroxy-4'-octoxybenzoyl)-benzene and 1,3-bis-(2'-hydroxy-4'-dodecyloxy-benzoyl)-benzene.

2.5 Esters of optionally substituted benzoic acids, such as, for example, phenyl salicylate, octylphenyl salicylate, di-benzoylresorcinol, bis-(4-tert.-butyl-benzoyl)-resorcinol, benzoyl-resorcinol, 3,5-di-tert.-butyl-4-hydroxybenzoic acid 2,4-di-tert.-butylphenyl ester, octadecyl ester or 2-methyl-4,6-di-tert.-butylphenyl ester.

2.6 Acrylates, such as, for example, α-cyano-β,β-diphenyl-acrylic acid ethyl ester or isooctyl ester, α-carbomethoxy-cinnamic acid methyl ester, α-cyano-o-β-methyl-p-methoxy-cinnamic acid methyl ester or butyl ester and N-(β-carbomethoxy-vinyl)-2-methyl-indoline.

2.7. Nickel compounds, such as, for example, nickel complexes of 2,2'-thio-bis-(4-tert.-octylphenol), such as the 1:1 and 1:2 complex, optionally with other ligands such as n-butylamine, triethanolamine or N-cyclohexyl-diethanolamine; nickel complexes of bis-(4-tert.-octylphenyl)-sulphone, such as the 2:1 complex, optionally with other ligands such as 2-ethyl-caproic acid; nickel dibutyldithiocarbamate, nickel salts of 4-hydroxy-3,5-di-tert.-butylbenzyl-phosphonic acid monoalkyl esters, such as the methyl, ethyl or butyl ester, the nickel complex of 2-hydroxy-4-methyl-phenyl-undecyl-ketonoxime and nickel 3,5-di-tert.-butyl-4-hydroxy-benzoate.

2.8. Oxalic acid diamides, such as, for example, 4,4'-dicotyloxyoxanilide, 2,2'-dioctyloxy-5,5'-di-tert.-butyloxanilide, 2,2'-di-dodecyloxy-5,5'-di-tert.-butyloxanilide, 2-ethoxy-5-tertiarybutyl-2'-ethyloxanilide, 2-ethoxy-2'-ethyl-oxanilide, N,N'-bis-(3-dimethylaminopropyl) oxalamide, mixture of o-and p-methoxy and o- and p-ethoxy-di-substituted oxanilides and mixtures of 2-ethoxy-5-tert.-butyl-2'-ethyl-oxanilide with 2-ethoxy-2'-ethyl-5,4'-di-tert.-butyloxanilide.

3. Metal deactivators, such as, for example, oxanilide, isophthalic acid dihydrazide, sebacic acid bis-phenylhydrazide, bis-benzylidene oxalic acid dihydrazide, N,N'-diacetyladipic acid dihydrazide, N,N'-bis-salicycloyl-oxalic acid dihydrazide, N,N'-bis-salicycloyl-hydrazine and N,N'-bis-(3,5-di-tert.-butyl-4-hydroxyphenyl-propionyl)-hydrazine.

4. Phosphites, such as, for example triphenylphosphate, diphenyl alkyl-phosphites, phenyl dialkyl-phosphites, trinonylphenyl-phosphite, triaurylphosphite, trioctadecylphosphite, 3,9-di-isodecyloxy-2,4,8,10-tetraoxo-3,9-diphospha-spiro[5.5]-undecane and tri-(4-hydroxy-3,5-di-tert.-butylphenyl)-phosphite.

5. Compounds which destroy peroxide, such as, for example, esters of β-thiodipropionic acid, e.g. the lauryl stearyl, myrystryl or tridecyl ester, salts of 2-mercaptobenzimidazole, e.g. the zinc salt, and diphenylthiourea.

6. Polyamide stabilizers, such as, for example, copper salts in combination with iodides and/or phosphorus compounds and salts of divalent manganese.

7. Basic co-stabilizers, such as, for example, polyvinylpyrrolidone, melamine, benzoguanamine, triallyl cyanurate, dicyandiamide, urea derivatives, hydrazine derivatives, amines, polyamides, polyurethanes and alkali metal salts and alkaline earth metal salts of higher saturated or unsaturated fatty acids, e.g. Ca stearate, Mg laurate, Na ricinoleate, K palmitate and Zn stearate.

8. PVC stabilizers, such as, for example, organic tin compounds, organic lead compounds and Ba/Cd salts of fatty acids.

9. Nucleating agents, such as, for example, 4-tert.-butylbenzoic acid, adipic acid and diphenylacetic acid.

10. Other additives, such as, for example, plasticizers, lubricants, e.g. glycerine monostearate, emulsifiers, antistatic agents, flameproofing agents, pigments, carbon black, asbestos, glass fibres, kaolin and talc.

Such other additives as described above may be advantageously employed in this invention together with the 4-aminopiperidine derivatives (I) at a ratio of 0.5–3 to 1.

Examples 1 to 9 describe synthetic polymer compositions having incorporated therein 4-aminopiperidine derivatives (I) and their stabilizing effects. Examples 10 to 15 describe the preparation of some 4-aminopiperidine derivatives (I) of this invention.

EXAMPLE 1

Into 100 parts of polypropylene ["Noblen JHH-G", trade name, twice recrystallized from monochlorobenzene, available from Mitsui Toatsu Chemicals Inc.] was incorporated 0.25 part of a stabilizer of this invention. The resulting mixture was blended and molten. The molten mixture was molded into a sheet with a thickness of 0.5 mm. under heating and pressure.

The sheet was exposed to ultraviolet irradiation at 45°C in a fade-meter and the time when the sheet became brittle was measured.

The results are shown in Table 1.

EXAMPLE 2

Into 100 parts of high-density polyethylene ["Hi-Zex", trade name, twice recrystallized from toluene, available from Mitsui Toatsu Chemicals Inc.] was incorporated 0.25 part of a stabilizer of this invention. The resulting mixture was blended and molten. The molten mixture was molded into a sheet with a thickness of 0.5 mm. under heating and pressure.

The sheet was exposed to ultraviolet irradiation at 45°C in a fade-meter and the time when the sheet became brittle was measured.

The results are shown in Table 1. The stabilizers numbered hereinafter are referred to hereinbefore.

Table 1

| Stabilizer No. | Polypropylene | High-density polyethylene | Stabilizer No. | Polypropylene | High-density polyethylene |
| --- | --- | --- | --- | --- | --- |
| 1 | 440 hrs. | 900 hrs. | 6 | 800 hrs. | 1680 hrs. |
| 2 | 540 | 1140 | 8 | 1780 | 2660 |
| 3 | 480 | 940 | 9 | 660 | 1420 |
| 4 | 620 | 1400 | 10 | 640 | 1360 |
| 5 | 840 | 1780 | 11 | 1680 | 2400 |
| 12 | 1620 | 2320 | 61 | 720 | 1440 |
| 13 | 780 | 1420 | 63 | 880 | 1620 |
| 14 | 560 | 1220 | 65 | 820 | 1680 |
| 16 | 720 | 1460 | 66 | 820 | 1600 |
| 18 | 740 | 1400 | 67 | 680 | 1280 |
| 22 | 780 | 1680 | 68 | 660 | 1120 |
| 24 | 540 | 1120 | 69 | 760 | 1840 |
| 25 | 680 | 1280 | 70 | 780 | 1960 |
| 26 | 520 | 1080 | 71 | 740 | 1920 |
| 28 | 600 | 1320 | 72 | 420 | 880 |
| 29 | 620 | 1440 | 73 | 840 | 1840 |
| 36 | 880 | 1840 | 74 | 560 | 1180 |
| 39 | 460 | 900 | 75 | 660 | 1100 |
| 41 | 520 | 980 | 77 | 480 | 940 |
| 42 | 560 | 1180 | 78 | 760 | 1300 |
| 44 | 540 | 1060 | 79 | 580 | 1260 |
| 46 | 480 | 880 | 80 | 660 | 1260 |
| 47 | 520 | 960 | 81 | 580 | 1120 |
| 50 | 520 | 1140 | 82 | 600 | 1120 |
| 51 | 540 | 1140 | 83 | 780 | 1980 |
| 54 | 600 | 1180 | 84 | 620 | 1300 |
| 55 | 920 | 1820 | 85 | 560 | 1140 |
| 56 | 820 | 1660 | 86 | 580 | 1180 |
| 58 | 520 | 1100 | 87 | 740 | 1820 |
| 59 | 640 | 1160 | 88 | 660 | 1360 |
| 89 | 480 | 1180 | 110 | 700 | 1520 |
| 90 | 540 | 1160 | 111 | 880 | 1940 |
| 91 | 460 | 940 | 113 | 680 | 1220 |
| 93 | 680 | 1220 | 114 | 600 | 1260 |
| 97 | 840 | 1760 | 116 | 660 | 1160 |
| 100 | 560 | 1240 | 118 | 820 | 1920 |
| 103 | 820 | 1660 | 121 | 580 | 1280 |
| 107 | 720 | 1680 | 124 | 640 | 1240 |
| 108 | 820 | 1740 | 126 | 1420 | 1720 |
| 109 | 720 | 1400 | None | 60 | 400 |

EXAMPLE 3

Into 100 parts of polystyrene ["Styron", trade name, recrystallized from a mixture of benzene-methanol, available from Asahi-Dow Limited] was incorporated 0.25 part of a stabilizer of this invention. The resulting mixture was molded at 180°C under pressure into a plate with a thickness of 1 mm.

The plate thus formed was exposed to ultraviolet irradiation in a fade-meter at 45°C for 500 hours. A test piece of the treated plate was tested for color difference by means of a color-difference colorimeter according to the method prescribed in Japanese Industrial Standard "K-7103", and the change of the yellowness index of the plate was calculated according to the following equation:

$$\Delta YI = YI - YI_0$$

wherein $\Delta YI$ means the change of yellowness index, $YI$ means the yellowness index after exposure and $YI_0$ means the initial yellowness index of a test piece.

The results are summarized in Table 2.

Table 2

| Stabilizer No. | $YI_0$ | $\Delta YI$ | Stabilizer No. | $YI_0$ | $\Delta YI$ |
| --- | --- | --- | --- | --- | --- |
| 5 | 5.2 | +2.5 | 63 | 5.0 | +2.0 |

Table 2-Continued

| Stabilizer No. | YI₀ | ΔYI | Stabilizer No. | YI₀ | ΔYI |
|---|---|---|---|---|---|
| 6 | 5.0 | +2.3 | 69 | 5.1 | +2.2 |
| 8 | 5.2 | +2.6 | 87 | 5.0 | +2.2 |
| 11 | 5.1 | +2.7 | 97 | 4.8 | +1.9 |
| 12 | 5.2 | +2.4 | 107 | 5.0 | +2.4 |
| 36 | 4.8 | +2.4 | 108 | 4.9 | +2.8 |
| 54 | 4.9 | +2.3 | 111 | 5.2 | +2.1 |
| 61 | 4.8 | +2.1 | None | 4.7 | +17.3 |

EXAMPLE 4

Into 100 parts of ABS resin ["Kane Ace B-12", trade name, available from Kanegafuchi Chemical Industry Co., Ltd.] was incorporated 0.5 part of a stabilizer of this invention, the resulting mixture was kneaded on a kneading roll at 160°C for 6 minutes and then molded into a sheet with a thickness of about 0.5 mm.

The sheet was treated in a sunshine weatherometer for 50 hours and tested with respect to the retention of ultimate elongation and of ultimate tensile strength as well as coloration degree.

The results are shown in Table 3.

Table 3

| Stabilizer No. | Weatherometer | |
|---|---|---|
| | Retention of elongation | Retention of tensile strength |
| 5 | 68% | 75% |
| 8 | 74 | 80 |
| 11 | 76 | 87 |
| 12 | 77 | 82 |
| 36 | 74 | 79 |
| 54 | 73 | 81 |
| 61 | 72 | 78 |
| 63 | 73 | 78 |
| 69 | 76 | 80 |
| 87 | 74 | 81 |
| 97 | 72 | 79 |
| 107 | 69 | 77 |
| 108 | 77 | 82 |
| 111 | 78 | 82 |
| None | 52 | 68 |

EXAMPLE 5

Into 100 parts of 6-nylon resin ["CM 1011", trade name, available from Toray Industries Inc.] was incorporated 0.25 part of a stabilizer of this invention. The resulting mixture was heated and melted and then molded into a film having a thickness of about 0.1 mm. under pressure by a compression molding machine. The film thus formed was aged under the following aging condition and thereafter subjected to a tensile test to determine the retention of tensile strength and elongation.

1. Ultraviolet irradiation in a fade-meter at 45°C for 200 hours
2. Aging with heating at 160°C for 2 hours in a Geer's aging tester The results are shown in Table 4.

Table 4

| Stabilizer No. | Fade-meter | | Geer's aging tester | |
|---|---|---|---|---|
| | Retention of ultimate elongation | Retention of ultimate tensile strength | Retention of ultimate elongation | Retention of ultimate tensile strength |
| 5 | 77% | 79% | 80% | 74% |
| 6 | 69 | 73 | 74 | 68 |
| 8 | 71 | 74 | 71 | 67 |
| 11 | 69 | 72 | 72 | 69 |
| 12 | 73 | 77 | 78 | 73 |
| 36 | 71 | 76 | 77 | 73 |
| 54 | 74 | 70 | 77 | 73 |
| 61 | 79 | 78 | 78 | 74 |
| 63 | 77 | 80 | 72 | 67 |
| 69 | 76 | 71 | 75 | 68 |
| 87 | 72 | 75 | 81 | 76 |
| 97 | 78 | 80 | 79 | 75 |
| 111 | 74 | 73 | 82 | 77 |
| None | 17 | 48 | 19 | 51 |

EXAMPLE 6

Into 100 parts of polyurethane resin prepared from polycaprolactone ["E-5080", trade name, available from The Nippon Elastollan Industries Ltd.] was incorporated 0.5 part of a stabilizer of this invention. The resulting mixture was heated and melted and then molded into a sheet having a thickness of about 0.5 mm. The sheet thus formed was exposed to ultraviolet irradiation in a fade-meter at 45°C for 15 hours and then tested with respect to the retention of ultimate elongation and ultimate tensile strength.

The results are given in Table 5.

Table 5

| Stabilizer No. | Retention of ultimate elongation | Retention of ultimate tensile strength |
|---|---|---|
| 5 | 91% | 78% |
| 6 | 82 | 79 |
| 8 | 81 | 76 |
| 11 | 83 | 80 |
| 12 | 88 | 77 |
| 36 | 87 | 80 |
| 54 | 87 | 75 |
| 61 | 91 | 84 |
| 63 | 90 | 88 |
| 69 | 88 | 83 |
| 87 | 86 | 83 |
| 97 | 86 | 83 |
| 111 | 85 | 82 |
| None | 73 | 50 |

EXAMPLE 7

Into 100 parts of polyvinyl chloride resin ["Geon 103EP", trade name, available from Nippon Zeon Co., Ltd.] were incorporated 3 parts of butyl tin maleate, 0.5 part of butyl stearate and 0.25 part of a stabilizer of this invention. The mixture was kneaded for 5 minutes on a kneading roll and 180°C and formed into a sheet with a thickness of 0.5 mm. The discoloration of the sheet was then observed after having subjected said sheet to aging testers as shown below.

1. Sunshine weatherometer for 300 hours
2. Aging with heating in a Geer's aging tester at 180°C for 60 minutes The results are shown in Table 6.

Table 6

| Stabilizer No. | Weatherometer | Geer's tester |
| --- | --- | --- |
| 5 | Pale brown | Pale yellow |
| 6 | " | " |
| 8 | " | " |
| 11 | " | " |
| 12 | " | " |
| 36 | " | " |
| 54 | " | " |
| 61 | " | " |
| 63 | " | " |
| 69 | " | " |
| 87 | " | " |
| 97 | " | " |
| 111 | " | " |
| None | Dark brown | Dark brown |

EXAMPLE 8

Into 100 parts of polyester resin ["Ester-G13", trade name, available from Mitsui Toatsu Chemicals, Inc.] were incorporated 1 part of benzoyl peroxide and 0.2 part of a stabilizer of this invention. The resulting mixture was cured by preheating to 60°C for 30 minutes and then heating to 100°C for an additional hour to give a plate with a thickness of 3 mm.

The plate thus formed wax exposed to irradiation in a sunshine weatherometer for 60 hours and the change of its yellowness index was determined according to the method described in the above Example 3.

The results are given in Table 7.

Table 7

| Stabilizer No. | $YI_0$ | $\Delta YI$ |
| --- | --- | --- |
| 5 | 2.3 | +7.5 |
| 8 | 2.6 | +8.3 |
| 11 | 2.5 | +8.6 |
| 12 | 2.3 | +7.2 |
| 36 | 2.4 | +7.1 |
| 61 | 2.4 | +7.6 |
| 63 | 2.2 | +7.2 |
| 69 | 2.1 | +7.0 |
| 87 | 2.3 | +8.3 |
| None | 1.8 | +13.6 |

EXAMPLE 9

Into 100 parts of polyethylene ["2100GP", trade name, available from Mitsu Toatsu Chemicals Inc.] or polypropylene ["JHH-G", available from Mitsu toatsu Chemical Inc., twice recrystallized from monochlorobenzene] were added 0.25 part of a stabilizer of this invention and 0.5 part of BHT 2,6-di-tert.butyl-hydroxytoluene and the mixture was mixed and melted and molded into a plate with a thickness of 3 mm under heating and pressure.

The plate was left in a dark place at 60°C for 3 or 4 weeks to investigate its coloration degree. The results are shown in Table 8. The stabilizing compounds of this invention do not show any coloration when blended with BHT.

Table 8

| Stabilizer No. | | Polyethylene 60°C, 3 weeks | Polypropylene 60°C, 4 weeks |
| --- | --- | --- | --- |
| 5 + | BHT | Colorless | Colorless |
| 6 + | " | " | " |
| 8 + | " | " | " |
| 11 + | " | " | " |

Table 8-Continued

| Stabilizer No. | | Polyethylene 60°C, 3 weeks | Polypropylene 60°C, 4 weeks |
| --- | --- | --- | --- |
| 12 + | " | " | " |
| 36 + | " | " | " |
| 54 + | " | " | " |
| 61 + | " | " | " |
| 63 + | " | " | " |
| 69 + | " | " | " |
| 87 + | " | " | " |
| 97 + | " | " | " |
| 107 + | " | " | " |
| 108 + | " | " | " |
| 111 + | " | " | " |
| 4-Crotonamido-2,2-6,6-tetramethyl-piperidine + BHT | | Yellow | Yellow |

EXAMPLE 10

1-Benzyl-4-butylamino-2,2,6,6-tetramethylpiperidine

A solution of 12.3 g. of 1-benzyl-2,2,6,6-tetramethyl-4-piperidone and 9.5 g. of butylamine in 200 ml. of methanol was added to a methanol suspension of a previously activated platinum catalyst and catalytic reduction was effected by shaking under a hydrogen pressure of 2-3 kg/cm² to absorb about 1.2l of hydrogen. The catalyst was filtered off from the reaction liquid, the mother liquor was concentrated, the residual liquid was subjected to distillation under reduced pressure to give 14.2 g. of the desired product a colorless liquid boiling at 171°-174°C/3 mmHg. Yield 94.0%.

Analysis for $C_{20}H_{34}N_2$:

Calculated: C, 79.41%; H, 11.33%; N, 9.26%. Found: C, 79.36%; H, 11.35%; N, 9.23%.

EXAMPLE 11

4-Acrylamido-1-allyl-2,2,6,6-tetramethylpiperidine

To 3.3 g. of 4-acrylamido-2,2,6,6-tetramethylpiperidine were added 0.9 g. of sodium hydroxide, 0.5 g. of sodium iodide and 5 g. of allyl bromide and the mixture was heated with stirring to 100°-110°C. for 10 hours. After cooling, a 10% aqueous solution of potassium carbonate was added to the reaction liquid and the mixture was extracted with ethyl acetate. The ethyl acetate solution was dried, concentrated and the residue was recrystallized from n-hexane to give the desired product as white crystals melting at 134°-135°C.

Analysis for $C_{15}H_{26}N_2O$:

Calculated: C, 71.95%; H, 10.47%; N, 11.19%.
Found: C, 72.02%, H, 10.54%; N, 11.04%.

EXAMPLE 12

4-Benzamido-1,2,2,6,6-pentamethylpiperidine

To 6 ml. of a 30% aqueous formalin solution was added 2.6 g. of 4-benzamido-2,2,6,6-tetramethylpiperidine and to the solution was added 2 g. of 90% formic acid. The mixture was heated to 80°-90°C for 5 hours. After cooling, the reaction liquid was poured into ice water and then a 50% aqueous solution of potassium hydroxide was added thereto. The crystalline substance which separated was recovered by filtration, washed with water, dried and recrystallized from cyclohexane to give 2.3 g. of the desired product as white crystals melting at 151°-152°C. Yield 85.0%.

Analysis for $C_{17}H_{26}N_2O$:

Calculated: C, 74.41%; H, 9.55%; N, 10.21%.

Found: C, 74.46%; H, 9.50%, N, 10.20%.

EXAMPLE 13

N,N'-Distearoyl-N,N'-bis(1,2,2,6,6-pentamethyl-4-piperidyl)-ethylenediamine

To 10 ml. of a 30% formalin solution in water was added 8.7 g. of N,N'-distearoyl-N,N'-bis(2,2,6,6-tetramethyl-4-piperidyl)ethylenediamine and then 4 g. of 90% formic acid was added with stirring. The mixture was heated to 80°–90°C for 5 hours. After cooling, the reaction liquid was poured into ice water. To this solution was added a 50% aqueous solution of potassium hydroxide to separate an oily substance, which was then extracted with benzene. The benzene solution was washed with water, dried and the benzene was distilled off. The residue was cooled to crystallize. Recovery by filtration and recrystallization from acetone gave 7.1 g. of the desired product as white crystals melting at 19°–21°C. Yield 88.8%.

Analysis for $C_{58}H_{114}N_4O_2$:
Calculated: C, 77.44%, H, 12.78%, N, 6.23%.
Found: C, 77.36%; H, 12.82%, N, 6.19%.

EXAMPLE 14

4-(N-Acryloylbutylamino)-1-benzyl-2,2,6,6-tetramethylpiperidine

To a solution of 60 g. of 1-benzyl-4-butylamino-2,2,6,6-tetramethylpiperidine in 60 ml. of ether was added an aqueous solution of sodium hydroxide (1.2 g. of sodium hydroxide, 5 ml. of water) and to the solution was added a solution of 2 g. of acryloyl chloride in 10 ml. of ether with stirring unde ice-cooling. The solution was left at room temperature for 1 hour and heated under reflux for additional 4 hours. After cooling, the ether layer was separated, washed with a 5% aqueous solution of sodium carbonate and water and dried, and the ether was distilled off. The crystalline residue was recrystallized from petroleum benzene to give 6.1 g. of the desired product as white crystals melting at 113°–115°C. Yield 85.8%

Analysis for $C_{23}H_{36}N_2O$:
Calculated: C, 77.48%; H, 10.18%, N, 7.86%.
Found: C, 77.54%; H, 10.10%; N, 7.89%.

IR spectrum (Nujol mull): $\nu_{C=O}$ 1645 cm$^{-1}$; $\nu_{C=C}$ 1607 cm$^{-1}$.

EXAMPLE 15

1-Allyl-4-(N-allylbenzylamino)-2,2,6,6-tetramethylpiperidine

To 5 g. of 4-benzylamino-2,2,6,6-tetramethylpiperidine were added 2.45 g. of sodium hydroxide, 1.3 g. of sodium iodide and 9.8 g. of allyl bromide and the mixture was heated with stirring to a bath temperature of 130°–140°C for 6 hours. After cooling, to the reaction liquid was added 50 ml. of a 10% aqueous solution of potassium carbonate and the mixture was extracted with benzene. The benzene solution was washed with water, dried and subjected to distillation under reduced pressure to give the desired product as a colorless liquid boiling at 183°–185°C/4 mmHg.

Analysis for $C_{22}H_{34}N_2$:
Calculated: C, 80.92%; H, 10.50%; N, 8.58%.
Found: C, 80.91%; H, 10.41%; N, 8.76%.

IR spectrum (liquid film): $\nu_{C=C}$ 1640 cm$^{-1}$.

According to the aforementioned methods A to D, the following compounds of the present invention were synthesized.

4-Amino-1,2,2,6,6-pentamethylpiperidine
bp 102°C/15 mmHg.

4-Acetamido-2,2,6,6-tetramethyl-1-octylpiperidine
bp 209°–211°C/1.5 mmHg.

4-Lauramido-1,2,2,6,6-pentamethylpiperidine
mp 36.5°–38.5°C.

1,2,2,6,6-Pentamethyl-4-stearamidopiperidine
mp 65°–66.5°C.

4-Acrylamido-1,2,2,6,6-pentamethylpiperidine
mp 129.4°–133°C.

4-Acrylamido-1-cyanomethyl-2,2,6,6-tetramethylpiperidine
mp 159°–160°C.

1,2,2,6,6-Pentamethyl-4-phenylacetamidopiperidine
mp 136°–137°C

β-Hydroxyethyl 1,2,2,6,6-pentamethyl-4-piperidylcarbamate
mp 112°–114°C

4-Benzylamino-1,2,2,6,6-pentamethylpiperidine
bp 141°–147°C/2 mmHg.

1,2,2,6,6-Pentamethyl-4-(p-toluenesulfonamido)piperidine
mp 137°–138°C

1-Cyclohexyl-3-(1,2,2,6,6-pentamethyl-4-piperidyl)urea
mp 157°–158°C

1-Phenyl-3-[2,2,6,6-tetramethyl-1-(2,3-epoxypropyl)-4-piperidyl]urea
mp 58°–62°C 1-(α-Naphtyl)-3-(1,2,2,6,6-pentamethyl-4-piperidyl)urea
mp 223°–225°C 1Ethyl-3-(1,2,2,6,6-pentamethyl-4-piperidyl)thiourea
mp 147°–147.5°C 1-Phenyl-3-(1,2,2,6,6-pentametyl-4-piperidyl)thiourea
mp 160.5°–161°C 4-(N-Benzoylbenzylamino)-1,2,2,6,6-pentamethylpiperidine
mp 83°–84°C 1,2,2,6,6-Pentamethyl-4-(N-tosyl-β-hydroxyethylamino)piperidine
mp 147°–148°C 1,9-Diaza-1,2,2,8,8,9,10,10-octamethyl-4-(N-methylisopropylamino)-spiro[5.5]undecane
bp 171°–172°C/4 mmHg.

1,2,2,6,6-Pentamethyl-4-(N-methylbenzylamino)-piperidine
bp 163°C/6 mmHg.

N-Methyl-bis(1,2,2,6,6-pentamethyl-4-piperidyl)amine
mp 94°–95°C 2,2,6,6-Tetramethyl-1-(2-propynyl)-4-(N-2-propynylbenzylamino)piperidine
bp 140°C/0.2 mmHg.

1Cyanomethyl-4-(N-cyanomethyl-benzylamino)-2,2,6,6-tetramethylpiperidine
mp 99°–100°C 1(2-Ethoxyethyl)-4-[N-(2-ethoxyethyl)benzylamino]2,2,6,6-tetramethylpiperidine
bp 189°–191°C/2 mmHg.

1-(2-Acetoxyethyl)-4-[N-(2-acetoxyethyl)benzylamino]-2,2,6,6-tetramethylpiperidine
bp 176°–178°C/2 mmHg.

1-Ethoxycarbonylmethyl-4-(N-ethoxycarbonylmethylbenzylamino)-2,2,6,6-tetramethylpiperidine
bp 200°–205°C/5 mmHg.

4-(N-Benzyl-p-methylbenzylamino)-2,2,6,6-tetramethyl-1-p-methylbenzylpiperidine
bp 264°–267°C/3 mmHg.

4-(N-Benzyl-p-chlorobenzylamino)-1-p-chlorobenzyl-2,2,6,6-tetramethylpiperidine
bp 281°–282°C/1 mmHg.

1,3-Bis(1,2,2,6,6-pentamethyl-4-piperidyl)urea
mp 174°–176°C

N,N'-Bis(1,2,2,6,6-pentamethyl-4-piperidyl)sebacamide
mp 176°–177°C 1,1'-Bis(1,2,2,6,6-pentamethyl-4-piperidyl)-3,3'-hexamethylenediurea
mp 222°–223°C 1,1'-Bis(1,2,2,6,6-pentamethyl-4-piperidyl)-3,3'-(2,4-tolylene)-diurea
mp 238°–238.5°C N,N'-Dibenzyl-N,N'-bis(1,2,2,6,6-pentamethyl-4-piperidyl)sebacamide
mp 141°–142°C N,N'-Dimethyl-N,N'-bis(1,2,2,6,6-pentamethyl-4-piperidyl)ethylenediamine
mp 80°–81°C N,N'-Dimethyl-N,N'-bis(1,2,2,6,6-pentamethyl-4-piperidyl)hexamethylene-1,6-diamine
bp 216°–219°C/1 mmHg.

4-Methacrylamido-1,2,2,6,6-pentamethylpiperidine
mp 123.5°–124.5°C

4-Crotonamido-1,2,2,6,6-pentamethylpiperidine
mp 133°–135°C 4-(N-Acetylallylamino)-1,2,2,6,6-pentamethylpiperidine
bp 155°–158°C/6 mmHg.

4-(N-Acetyl-2-propynylamino-1,2,2,6,6-pentamethylpiperidine
mp 108°–109°C 4-(2-Hydroxyethoxycarbonylamino)-1,2,2,6,6-pentamethylpiperidine
mp 114°C

What is claimed is:

1. A synthetic polymer composition stabilized against photo- and thermal deterioration wherein there is incorporated from 0.01 to 5.0 percent by weight, based on the weight of the synthetic polymer, of a compound having the formula (I)

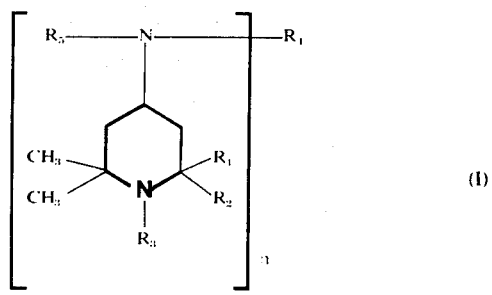

wherein $R_1$ and $R_2$ each represent methyl or $R_1$ and $R_2$ together with the carbon atom to which they are linked represent a group having the formula $R_3$ represents alkyl having 1 to 8 carbon atoms; substituted alkyl having 1 to 3 carbon atoms in the alkyl moiety and which is selected from the group consisting of hydroxyalkyl, alkoxyalkyl having 1 or 2 carbon atoms in its alkoxy moiety, phenoxyalkyl, aliphatic acyloxyalkyl having 2 to 18 carbon atoms in the acyl moiety, aromatic acyloxyalkyl having 7 to 11 carbon atoms in the acyl moiety, halogenoalkyl, cyanoalkyl, epoxyalkyl, aminoalkyl substituted by alkyl having 1 to 4 carbon atoms, alkoxycarbonylalkyl having 1 to 4 carbon atoms in the alkoxy moiety and phenoxycarbonyl-alkyl; alkenyl having 3 or 4 carbon atoms; alkynyl having 3 or 4 carbon atoms or benzyl the phenyl radical of which can be substituted by alkyl having 1 to 4 carbon atoms or by chlorine, $n$ represents the integer 1, 2 or 3, $R_4$ represents, when $n$ is 1, hydrogen, alkyl having 1 to 18 carbon atoms; substituted alkyl, alkenyl, alkynyl or unsubstituted or substituted benzyl as defined under $R_3$; 3,5-di-tert-butyl-4-hydroxybenzyl; cycloalkyl having 5 or 6 carbon atoms; aryl having 6 to 10 carbon atoms in the aryl and which may be substituted on said aryl by alkyl or alkoxy having 1 to 4 carbon atoms; aliphatic monoacyl having 2 to 18 carbon atoms; cycloaliphatic monoacyl having 6 or 7 carbon atoms; aromatic monoacyl having 6 to 10 carbon atoms in the aryl moiety and which can be substituted on said aryl by alkyl having 1 to 4 carbon atoms, chlorine, hydroxyl or methoxy; heterocyclic monoacyl containing O- or N-atoms; alkoxycarbonyl having 1 to 8 carbon atoms in the alkoxy moiety and which can be substituted by hydroxyl; benzyloxycarbonyl; carbamoyl and thiocarbamoyl which are unsubstituted or substituted on the N-atom by alkyl having 1 to 4 carbon atoms cyclohexyl, phenyl, chlorophenyl, naphthyl or benzyl; a monovalent group which is derived, by removing a hydroxyl group, from methanesulfenic acid, benzenesulfenic acid, benzenesulfinic acid, methanesulfonic acid, benzenesulfonic acid, p-toluenesulfonic acid or diphenyl-phosphorus acid, or, $R_4$ and $R_5$, together with the nitrogen atom to which they are linked, represent a phthalimido group;

$R_4$ represents, when $n$ is 2, alkylene having 2 to 6 carbon atoms, alkenylene having 4 to 6 carbon atoms, aralkylene having 8 to 10 carbon atoms, p,p'-methanediphenylene, carbonyl, aliphatic diacyl having 2 to 18 carbon atoms, aromatic diacyl having 8 carbon atoms; N-substituted dicarbamoyl or N-substituted bis-thiocarbamoyl which are substituted by alkylene having 2 to 6 carbon atoms, arylene having 6 to 8 carbon atoms or p,p'-methanediphenylene; a divalent group derived, by removing two hydroxyl groups, from sulfurous acid, sulfuric acid, benzene-1, 3-disulfonic acid, phenylsulfurous acid or phenylphosphoric acid;

or, $R_4$ and $R_5$, together with the nitrogen atom to which they are linked, represent a pyromellitdiimido group;

$R_4$ represents, when $n$ is 3, an alkanetriyl group having 5 or 6 carbon atoms; an aralkanetriyl group having 9 carbon atoms; an aliphatic triacyl group having 6 carbon atoms; an aromatic triacyl group having 9 carbon atoms, or a trivalent group derived, by removing three hydroxyl groups, from phosphoric acid, phosphorous acid or boric acid, or a group having the formulae

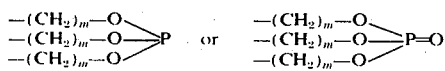

wherein $m$ represents an integer from 1 to 4; and $R_5$ represents hydrogen; a substituted alkyl group, an alkenyl or alkynyl group, or an unsubstituted or substituted benzyl group as defined under $R_3$; an unsubstituted alkyl group, a cycloalkyl group, an unsubstituted or substituted aryl group as defined under $R_4$; an alkoxycarbonylalkenyl group having 1 to 4 carbon atoms in the alkoxy moiety and 2 or 3 carbon atoms in the alkenyl moiety; a 2-thiazolyl-, 2-pyridyl- or 2-pyrimidyl group or a group having the formula

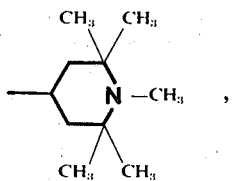

or, when $R_4$ represents an alkylene, alkenylene, aralkylene, alkanetriyl or aralkanetriyl group, $R_5$ represents an acyl or alkoxycarbonyl group as defined under $R_4$, an unsubstituted or N-substituted carbamoyl or thiocarbamoyl group as defined under $R_4$ or a monovalent group as defined under $R_4$.

2. A synthetic polymer composition as claimed in claim 1 wherein $R_1$ and $R_2$ each represent methyl.

3. A synthetic polymer composition as claimed in claim 1 wherein $R_3$ is an alkyl group having 1 to 4 carbon atoms, an allyl group, an alkoxycarbonylmethyl group having 1 to 4 carbon atoms in the alkoxy moiety, a 2,3-epoxypropyl group, an aliphatic acyloxyethyl group having 2 to 4 carbon atoms in the acyl moiety or a benzyl group.

4. A synthetic polymer composition as claimed in claim 1 wherein $R_4$ represents an alkyl group having 1 to 8 carbon atoms, a 2,3-epoxypropyl group, an allyl group, a benzyl group, an aliphatic monoacyl group having 2 to 18 carbon atoms, a benzoyl group, the 2-hydroxyethoxycarbonyl group, an alkylene group having 2 to 6 carbon atoms or an aliphatic diacyl group having 2 to 18 carbon atoms.

5. A synthetic polymer composition as claimed in claim 1 wherein $R_5$ represents hydrogen, an alkyl group having 1 to 8 carbon atoms, the hydroxyethyl, phenyl, cyclohexyl or benzyl group.

6. A synthetic polymer composition as claimed in claim 1 wherein n is an integer of 1 or 2.

7. A synthetic polymer composition as claimed in claim 1 wherein there is incorporated a compound having the formula

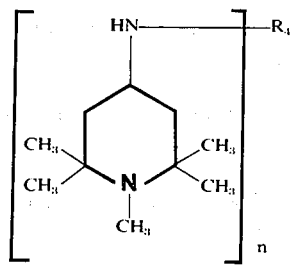

wherein $n$ represents an integer of 1 or 2, and, when $n$ is 1, $R_4$ represents a saturated aliphatic monoacyl group having 8 to 10 carbon atoms, an unsaturated aliphatic monoacyl group having 3 or 4 carbon atoms or the 2-hydroxyethoxycarbonyl group, and, when n is 2, $R_4$ represents a saturated aliphatic acyl group having 4 to 10 carbon atoms.

8. A synthetic polymer composition as claimed in claim 1 wherein said polymer is a polyolefin.

9. A synthetic polymer composition as claimed in claim 1 wherein said polymer is a polyvinyl chloride.

10. A synthetic polymer composition as claimed in claim 1 wherein said polymer is a polyurethane.

11. A synthetic polymer composition as claimed in claim 1 wherein said polymer is a polyamide.

12. A synthetic polymer composition as claimed in claim 1 wherein said compound of formula I is selected from the group consisting of 1,2,2,6,6-pentamethyl-4-stearamidopiperidine, 4-acrylamido-1,2,2,6,6-pentamethylpiperidine, 4-methacrylamido-1,2,2,6,6-pentamethylpiperidine, 4-crotonamido-1,2,2,6,6-pentamethylpiperidine, and 4-(2-hydroxyethoxycarbonylamino)-1,2,2,6,6-pentamethylpiperidine.

* * * * *

UNITED STATES PATENT OFFICE
CERTIFICATE OF CORRECTION

Patent No. 3,904,581　　　　　　　　　　Dated September 9, 1975

Inventor(s) KEISUKE MURAYAMA, S. MORIMURA, K. MATSUI et al

It is certified that error appears in the above-identified patent and that said Letters Patent are hereby corrected as shown below:

In the heading of the patent, insert

--[30] Foreign Application Priority Data

Oct.4,1972　　Japan................99599/72

*Signed and Sealed this*

*twenty-third* Day of *December 1975*

[SEAL]

Attest:

RUTH C. MASON
*Attesting Officer*

C. MARSHALL DANN
*Commissioner of Patents and Trademarks*